United States Patent
McBride

(10) Patent No.: US 9,501,303 B1
(45) Date of Patent: Nov. 22, 2016

(54) SYSTEMS AND METHODS FOR MANAGING COMPUTING RESOURCES

(71) Applicant: Express Scripts, Inc., St. Louis, MO (US)

(72) Inventor: James McBride, St. Louis, MO (US)

(*) Notice: Subject to any disclaimer, the term of this patent is extended or adjusted under 35 U.S.C. 154(b) by 0 days.

(21) Appl. No.: 14/477,137

(22) Filed: Sep. 4, 2014

Related U.S. Application Data

(60) Provisional application No. 61/873,439, filed on Sep. 4, 2013.

(51) Int. Cl.
*G06F 9/455* (2006.01)
*G06F 9/50* (2006.01)

(52) U.S. Cl.
CPC ......... *G06F 9/45533* (2013.01); *G06F 9/5005* (2013.01)

(58) Field of Classification Search
CPC ..................... G06F 9/45533; G06F 9/5005
USPC ........................................................ 718/1
See application file for complete search history.

(56) References Cited

U.S. PATENT DOCUMENTS

| | | | | |
|---|---|---|---|---|
| 7,571,120 | B2* | 8/2009 | Fellenstein | G06F 9/5072 705/26.3 |
| 8,195,502 | B2* | 6/2012 | Hilkemeyer | G06Q 30/0206 705/400 |
| 8,418,251 | B1* | 4/2013 | Satish | G06F 21/562 726/22 |
| 8,510,821 | B1* | 8/2013 | Brandwine | H04L 63/1416 709/229 |
| 8,639,787 | B2 | 1/2014 | Lagergren et al. | |
| 8,739,157 | B2* | 5/2014 | Ho | G06F 9/5077 718/1 |
| 2008/0127084 | A1* | 5/2008 | Sattler | G06F 9/44505 717/121 |
| 2010/0146510 | A1* | 6/2010 | Teichmann | G06F 9/4825 718/101 |
| 2012/0260248 | A1* | 10/2012 | Katiyar | G06F 9/45533 718/1 |
| 2012/0324069 | A1 | 12/2012 | Nori et al. | |
| 2013/0031550 | A1* | 1/2013 | Choudhury | G06F 9/45558 718/1 |

(Continued)

OTHER PUBLICATIONS

Kondo et al. "Cost-Benefit Analysis of Cloud CODIputing versus Desktop Grids", 2009, IEEE.*

(Continued)

*Primary Examiner* — Anna Deng
*Assistant Examiner* — Junchun Wu
(74) *Attorney, Agent, or Firm* — Husch Blackwell LLP

(57) ABSTRACT

Systems and methods for managing computing resources are disclosed. In an example embodiment, a computing system request is received. The computing system request may be in a standardized request format and include a codified architecture and topology criterion. A build request is generated based on the computing system request. A computing resource device in accordance with the codified architecture and meeting the topology criterion is identified. A virtual machine is built on the computing resource device based on the build request. A plurality of applications is deployed on the virtual machine based on the build request to create an instantiated software deployment. Additional methods and systems are disclosed.

17 Claims, 5 Drawing Sheets

(56) References Cited

U.S. PATENT DOCUMENTS

| | | | |
|---|---|---|---|
| 2013/0042234 A1* | 2/2013 | DeLuca | G06F 9/45558 718/1 |
| 2013/0091284 A1* | 4/2013 | Rothschild | G06F 3/067 709/226 |
| 2013/0159998 A1* | 6/2013 | Cawlfield | G06F 9/45558 718/1 |
| 2013/0198354 A1 | 8/2013 | Jones et al. | |
| 2013/0227569 A1* | 8/2013 | Kohli | G06F 9/455 718/1 |
| 2013/0232498 A1* | 9/2013 | Mangtani | G06F 9/5072 718/104 |
| 2013/0268674 A1 | 10/2013 | Bailey et al. | |
| 2014/0201732 A1* | 7/2014 | Haag | G06F 9/45533 718/1 |
| 2014/0245292 A1* | 8/2014 | Balani | G06F 9/5077 718/1 |
| 2014/0257910 A1* | 9/2014 | Anders | G06Q 10/06313 705/7.23 |
| 2014/0282534 A1* | 9/2014 | Sehr | G06F 9/455 718/1 |
| 2015/0309780 A1* | 10/2015 | Ruehl | H04L 67/1095 717/176 |

OTHER PUBLICATIONS

Menasce et al. "Cost-Performance Analysis of Heterogeneity in Supercomputer Architectures", 1990, ACM/IEEE.*
Krsul et al. "VMPlants: Providing and Managing Virtual Machine Execution Environments for Grid Computing", 2004, IEEE.*

* cited by examiner

SYSTEMS AND METHODS FOR MANAGING COMPUTING RESOURCES

CROSS-REFERENCE TO A RELATED APPLICATION

This application claims the benefit of U.S. provisional patent application 61/873,439 filed on 4 Sep. 2013, entitled "Systems and Methods for Managing Cloud Computing Resources," the entire disclosure of which is incorporated herein by reference.

FIELD

The field relates to systems and methods for managing computing resources, and more particularly to systems and methods for managing computer resources for deployment of software applications.

BACKGROUND

Companies use local and remote computer servers to provide a computing environment for its various software applications. The computer servers can have various hardware and software capabilities to enable successful deployment of the software applications.

DETAILED DESCRIPTION

Example systems and methods for managing computing resources are described. In the following description, for the purpose of explanation, numerous specific details are set forth in order to provide a thorough understanding of example embodiments. It will be evident, however, to one of ordinary skill in the art that embodiments of the invention may be practiced without these specific details.

Companies may seek to utilize internal and external servers for deployment of applications. To reduce dollar cost and time associated with analysis, standardization of architecture and other capabilities of servers and server pools as may be maintained by a single company or multiple companies may be known or determined (e.g., by use of a tracer). Applications may then be moved, or redeployed, on servers meeting the requirements of the applications at a certain frequency (e.g., multiple times per day, daily, weekly, monthly, or the like) to take advantage of differences in costs. Other factors including geographic location, HIPPA compliance, server cost, and deployment cost may be considered in determining where and when to deploy and redeploy applications.

In some embodiments, the systems and methods may enable a company to reduce cost associated with managing applications. In some embodiments, the systems and methods may enable faster and more reliable moving of applications among servers internal and external to a company.

Figure 1:
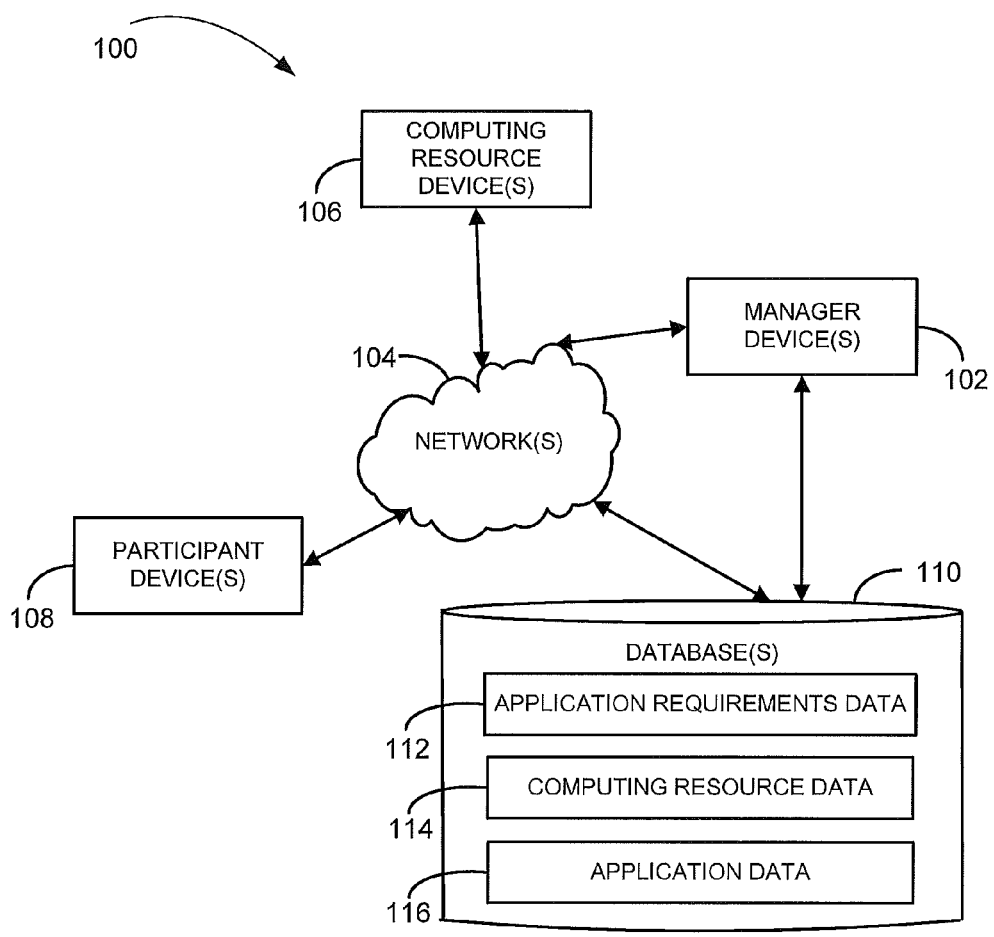
FIG. 1 is a block diagram of an example system according to an example embodiment.

FIG. 1 is a block diagram of an example system 100, according to an example embodiment. The system 100 is an example embodiment in which computing resources may be managed. The system 100 includes a manager device 102 in communication with computing resource devices 106 and a participant device 108 over a network 104.

The manager device 102 is a device operated by an entity that is at least partially responsible for managing the configuration of computing resource devices 106 (e.g., cloud-based computing resource devices 106) and the deployment of computing applications onto the computing resource devices 106. The configuration may include device selection (e.g., including device capability), device purchase, and location selection of computing resource devices 106, making available a number of the computing resource devices 106, configuring device basics, security, and accessibility of and the computing resource devices 106, and the like. For example, the entity operating the manager device 102 may be an entity executing computing applications on the computing resource devices 106. As such, the entity operating the manager device 102 may be managing the configuration of the computing resource devices 106 and the deployment of applications onto the computing resource devices 106 for its own benefit and/or the benefit of another entity.

Examples of the devices 102, 106, 108 include a personal computer, a notebook computer, a tablet computer, a netbook computer, a server computer, a minicomputer, a set-top box (STB), a receiver card, a mobile telephone, a personal digital assistant (PDA), a display device, a portable gaming unit; however other devices may also be used. For example, the devices 102, 106, 108 may include a desktop computing system or a mobile electronic device, such an IPHONE or IPAD device by Apple, Inc., mobile electronic devices powered by ANDROID by Google, Inc., and a BLACKBERRY device by Research In Motion Limited.

The network 104 by which the devices 102, 106, 108 communicate may include, by way of example, an Internet Protocol (IP) network, a Wireless Application Protocol (WAP) network, a WiFi network, or an IEEE 802.11 standards network, Mobile Communications (GSM) network, a code division multiple access (CDMA) network, 3rd Generation Partnership Project (3GPP), as well as various combinations thereof. The network 104 may also include optical communications. Other conventional and/or later developed wired and wireless networks may also be used.

The computing resource devices 106 may include computing hardware, software, and infrastructure necessary for hosting and/or executing a variety of applications. As such, the computing resource devices 106 may include physical computing resources, such as processors, storage devices, networking infrastructure, and the like. Further, in some embodiments the computing resource devices 106 may include software and/or firmware for establishing and managing hardware virtualization (e.g., the creation and management of virtual machines) hosted on the computing resource devices 106. In some embodiments, the computing resource devices 106 may be housed within data centers. In some embodiments, the computing resource devices 106 may be operated by the entity operating the manager device 102, or may be provided by another entity. Commercial examples of the computing resource devices 106 provided by entities may include Amazon AWS, Rackspace, Joyent-Cloud, or the like. The computing resource devices 106 may be commonly operated, and/or may be operated by different entities. Further, the computing resource devices 106 may be located in a variety of different geographic locations.

By way of example, a particular entity may own and/or lease a certain number of computing resource devices 106 internally and available through data centers managed by third parties. The entity may, in some embodiments, also allow usage of these computing resource devices 106 to third parties. In addition, the company may also utilize additional third-party computing resource devices 106 on an as desired basis.

The participant device 108 is a device used by a participant that seeks to utilize computing resource devices 106. The participant device 108 may enable the device operator to request certain application deployments on the computing resource devices 106 for usage on its behalf or on behalf of an entity on whose behalf it is acting.

As generally mentioned above, in some embodiments, the entity operating the manager device 102 may manage the configuration of the computing resource devices 106 and the deployment of applications onto the computing resource devices 106 to allow the entity operating the manager device 102 to utilize the applications deployed onto the computing resource devices 106 for the entity's own benefit, to allow another entity to utilized the applications for the other entity's benefit, and/or in part to allow the entity to utilized the applications for the entity's benefit, and in part to allow the other entity to utilize the applications for the other entity's benefit. In some embodiments, the computing resource devices 106 (which may be operated by a third party) may be utilized to host the applications to obviate the need for the entity utilizing the applications to own (or lease), maintain, manage, or otherwise be ultimately responsible for the physical hardware and communications infrastructure necessary for the operating and utilization of the applications. In some embodiments, the computing resource devices 106 may allow for scaled CPU resources, storage resources, bandwidth, or the like. For example, as applications hosted on the computing resource devices 106 require additional resources, the additional required resources may be allocated for use by the applications.

The manager device 102 may be in communication directly (e.g., through local storage) and/or through the network 104 (e.g., in a cloud configuration or software-as-a-service) with a device that stores a database 110. The database 110 may be deployed on the manager device 102, on a computing resource device 106, on a separate device, or may otherwise be deployed. The database 110 may store application requirements data 112, computing resource data 114, and/or application data 116.

The application requirements data 112 may include information specifying the requirements necessary for running one, or more than one, application that may be hosted by the computing resource devices 106. For example, different applications may include particular bandwidth requirements, certification requirements (e.g., an application may require HIPAA compliance, ISO certifications, security requirements, or the like), location requirements (e.g., to ensure acceptable latency during utilization of the application), or the like. Further, the application requirements data 112 may include weighting factors associated with one, or more than one, of the application requirements.

The computing resource data 114 may include, for example, information regarding the attributes of the various computing resources available through the computing resource devices 106 and/or attributes of the computing resource devices 106. Examples of the computing resource data 114 may include service history information (e.g., historical information regarding quality of service provided or service issues), pricing information, geographical information (e.g., information regarding geographical locations of the computing resources, such as data centers), certification information (e.g., HIPAA compliance and ISO compliance). At least some of the attributes included within the computing resource data 114 may change over time. Accordingly, in some embodiments, the computing resource data 114 may be updated (e.g., as by querying the operators of the computing resource devices 106 or the computing resource devices 106 directly), continuously, periodically, when the computing resource data 114 is requested (e.g., by the manager device 102), or the like.

The application data 116 may include data that is utilized by applications for performing one, or more than one, function provided by the applications. For example, if the application is a pharmacy claims adjudication application, the application data 116 may include pharmacy claims data, drug benefit program member data, pharmacy data, drug data, and the like. Similarly, if the application is a customer relationship management application, the application data 116 may include customer data, project data, opportunity data, and the like, which may be utilized by the application for performing one, or more than one, function provided by the application. The application data 116 may store data for a single application or multiple applications.

While the system 100 in FIG. 1 is shown to include single devices 102, 106, and 108, multiple devices may be used. The devices 102, 106, 108 may be the same type of device or may be different device types. When multiple devices are present, the multiple devices may be of the same device type or may be a different device type. Moreover, system 100 shows a single network 104, however, multiple networks can be used. The multiple networks may communicate in series with each other to link the devices 102, 106, 108 or in parallel to link the devices 102, 106, 108.

The manager device 102 may be in a client-server relationship with the participant device 108, a peer-to-peer relationship with the participant device 108, or in a different type of relationship with the participant device 108.

Figure 2:
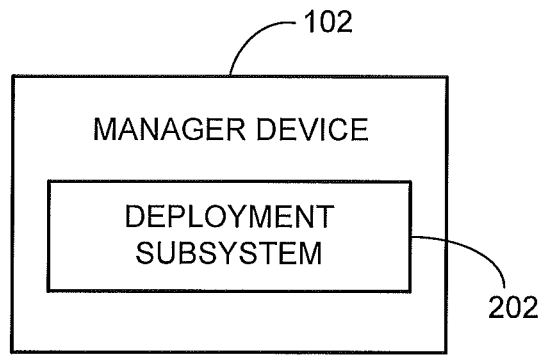
FIG. 2 is a block diagram of an example manager device that may be deployed within the system of FIG. 1, according to an example embodiment.

FIG. 2 illustrates the manager device 102, according to an example embodiment. The manager device 102 may be used by a device operator to manage computing resources. The manager device 102 may be deployed in the system 100, or may otherwise be used.

The manager device 102 may include a deployment subsystem 202. The deployment subsystem 202 may enable at least some operations for managing computing resources through the computing resource devices 106, including, but not limited to, identifying suitable computing resource devices 106, configuring applications for execution on the computing resource devices 106, managing the applications, and deploying the applications to the computing resource devices 106 for execution.

In an embodiment, all of the functionality of the deployment subsystem 202 may be performed by the manager device 102. In some embodiments, at least a portion of the functionality of the deployment subsystem 202 may be performed by the manager device 102, and at least a portion of the functionality of the deployment subsystem 202 may be performed by the computing resource device 106 and/or the participant device 108.

In some embodiments, the deployment subsystem 202 may facilitate the configuration, management, and deployment of applications across various computing resources devices 106. In some embodiments the computing resource devices 106 may include various distributed computing systems, which may be controlled and/or operated by the entity operating the manager device 102, including the deployment subsystem 202, or may be controlled and/or operated by a third party. Accordingly, in some embodiments the applications may be remotely deployed from entity operating the manager device 102. In some embodiments, the computing resource devices 106 may be configured in a cloud computing configuration.

Figure 3:
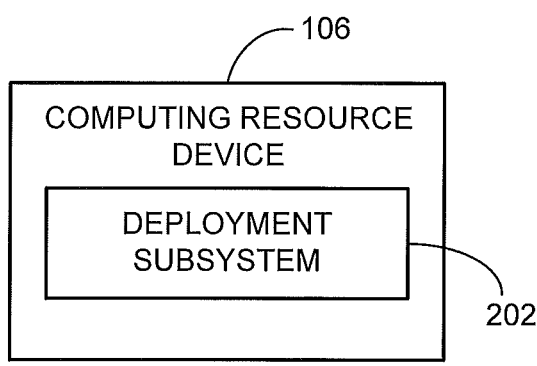
FIG. 3 is a block diagram of an example computing resource device that may be deployed within the system of FIG. 1, according to an example embodiment.

FIG. 3 illustrates the computing resource device 106, according to an example embodiment. The computing resource device 106 may be used by a device operator to manage computing resources. The computing resource device 106 may be deployed in the system 100, or may otherwise be used. The computing resource device 106 may include the deployment subsystem 202.

Figure 4:
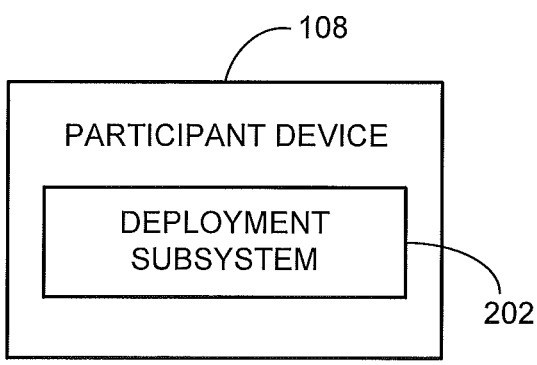
FIG. 4 is a block diagram of an example participant device that may be deployed within the system of FIG. 1, according to an example embodiment.

FIG. 4 illustrates the participant device 108, according to an example embodiment. The participant device 108 may be used by a device operator to manage computing resources. The participant device 108 may be deployed in the system 100, or may otherwise be used. The participant device 108 may include the deployment subsystem 202.

Figure 5:
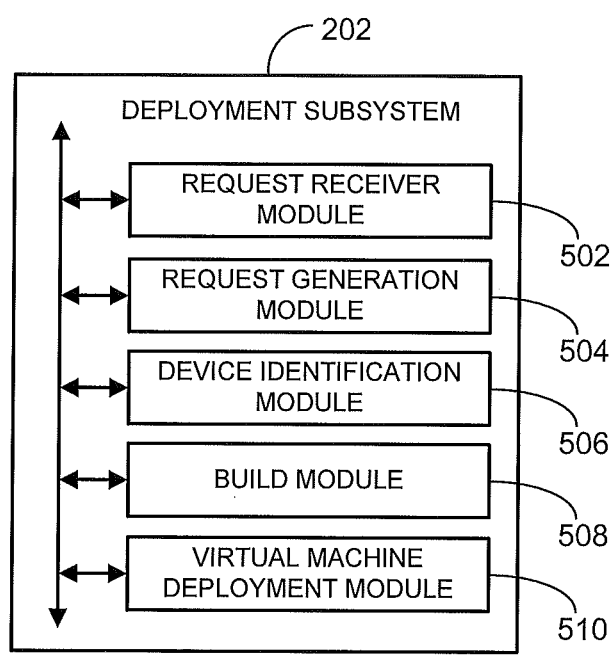
FIG. 5 is a block diagram of an example deployment subsystem that may be deployed within the manager device of FIG. 2, the computing resource device of FIG. 3, or the participant device of FIG. 4, according to an example embodiment.

FIG. 5 illustrates an example deployment subsystem 202 that may be deployed in the manager device 102, the computer resource device 106, the participant device 108, or otherwise deployed in another system. One or more modules are communicatively coupled and included in the deployment subsystem 202 to enable configuring, managing, and deploying applications on various computing resources. The modules of the deployment subsystem 202 that may be included are a request receiver module 502, a request generation module 504, a device identification module 506, a build module 508, and/or a virtual machine deployment module 510. Other modules may also be included.

In some embodiments, the modules of the deployment subsystem 202 may be distributed so that some of the modules are deployed in the manager device 102, some of the modules are deployed in the computing resource device 106, and/or some of the modules deployed in the participant device 108. In one embodiment, the modules are deployed in memory and executed by a processor coupled to the memory. The functionality contained within the modules 502-510 may be combined into a lesser number of modules, further divided among a greater number of modules, or redistributed among existing modules. Other configurations including the functionality of the modules 502-510 may be used.

The request receiver module 502 receives a computing system request. The computing system request is generally in a standardized request format and includes a codified architecture and topology criterion. In general, the topology criterion typically does not include architecture-related characteristics such as processing speed or memory space, but rather includes a characteristic about the physical location or deployment of the computing resource device 106 such that a request can satisfy a non-architecture-related characteristic. For example, the topology criterion may include a geographic location, a distance from a location, a security attribute (e.g., HIPPA compliant), an architecture type, or the like. In general, the standardized request format includes computing capabilities, memory requirements, storage requirements, or combinations thereof. The codified architecture generally reflects attributes of the desired architecture that can be selected (e.g., through a code) or otherwise indicated in a computing system request. For example, the computing system request may specify the architecture requirements for its applications from standard, available architecture configurations.

The request generation module 504 generates a build request based on the computing system request. In some embodiments, the build request includes a request to allocate at least sufficient computing resources to support an application identified in the computing system request. In some embodiments, the build request includes a request to instantiate an application identified in the computing system request.

The device identification module 506 identifies a computing resource device 106 among available computing resource devices 106 in accordance with the codified architecture and meeting the topology criterion. In some embodiment, the device identification module 506 analyzes available and/or known computing resource devices 106 to identify a computing resource device as being in accordance with the codified architecture and meeting the topology criterion.

In some embodiments, the device identification module 506 uses known information regarding the computing resource devices 106 in making its identification. In some embodiments, the device identification module 506 transmits tracers to certain computing resource devices 106 to determine capability. The resulting information regarding capability may be stored in the computing resource data 114 of the database 110.

The build module 508 builds a virtual machine on the identified computing resource device 106 based on the build request. In some embodiments, the build module 508 associates and/or reassociates resources with an application on a virtual machine. For example, the application may be moved from one virtual machine to another when a new computing resource device 106 is selected for application deployment. In some embodiments, associating the resources includes mapping the resources to the application on the virtual machine.

The virtual machine deployment module 510 deploys applications on the virtual machine based on the build request to create an instantiated software deployment. In some embodiments, the virtual machine deployment module 510 disables the instantiated software deployment based on creation of the additional instantiated software deployment. Through such deployment and disabling, the application can be moved to operate on a different computing resource device 106.

In some embodiments, an additional virtual machine may be built on a different computing resource device 106 by the build module 508 and the applications deployed on the virtual machine may also be deployed on the additional virtual machine by the deployment module 520. The building and deployment operations may be based on receipt of a build request to create an additional instantiated software deployment by the request receiver module 502.

The device identification module 506 may calculate an instantiated software deployment cost associated with use of the instantiated software deployment. In some embodiments, calculating the additional instantiated software deployment cost includes determining an additional virtual creation cost associated with building the additional virtual machine and deployment of the applications on the additional virtual machine and determining a future use operation cost associated with the additional instantiated software deployment after building the additional virtual machine and deployment of the applications on the additional virtual machine. In some embodiments, the device identification module 506 calculates multiple instantiated software deployment costs associated with future use of the instantiated software deployment and selects the additional instantiated software deployment for creation based on a determination that the additional instantiated software deployment cost is less than the instantiated software deployment cost. In some embodiments, the cost calculation may be used to determine whether resource capability should be used at the existing computing resource device 106, at a different internal computing resource device 106, or at an external internal computing resource device 106.

Figure 6:
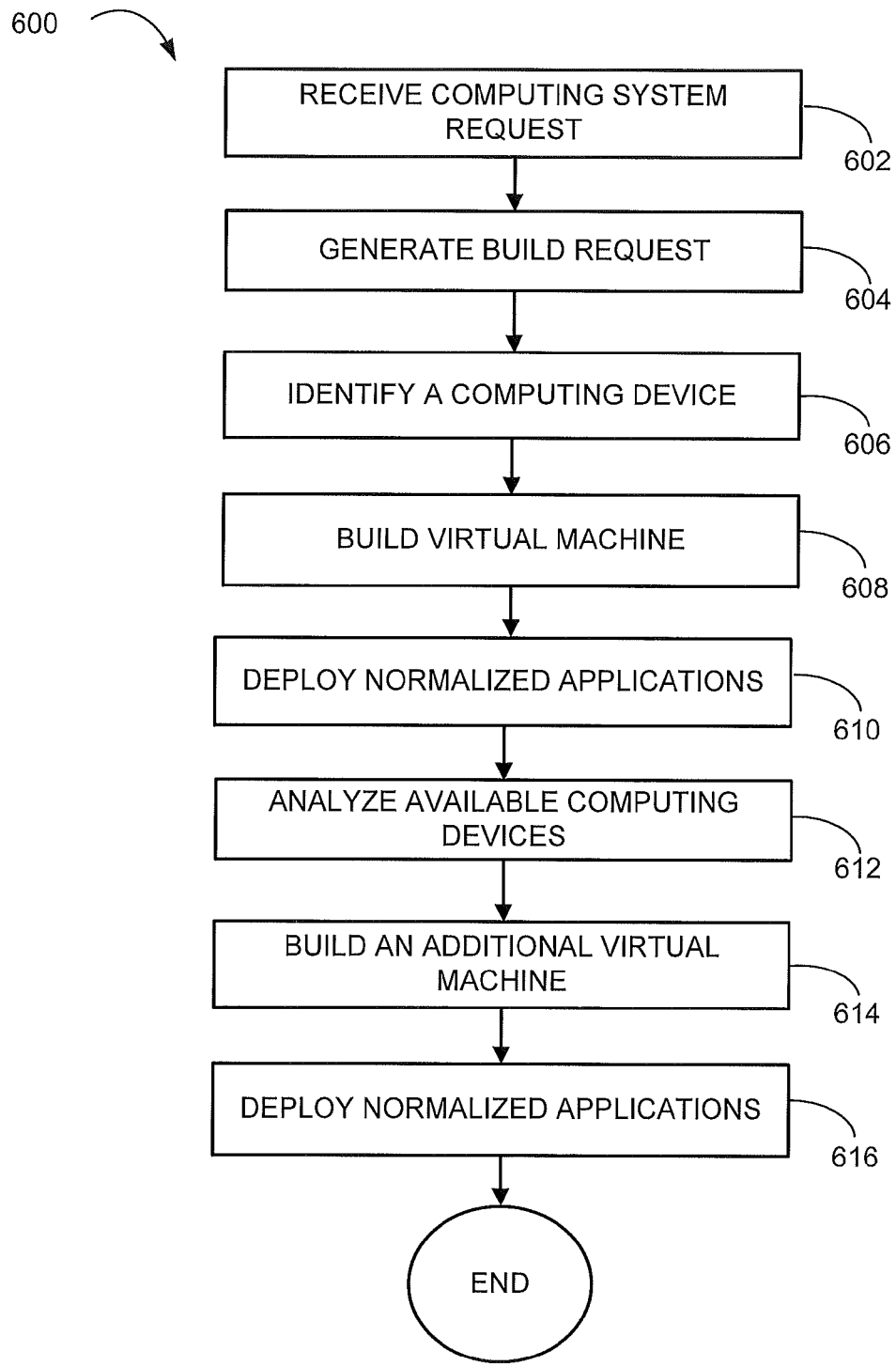
FIG. 6 is an example process flow illustrating a method for managing computing resources, according to an example embodiment.

FIG. 6 illustrates an example method 600 for managing computing resources, according to an example embodiment. The method 600 may be performed by the manager device 102, by the computing resource devices 106, the participant device 108, partially by the manager device 102 and partially by the computing resource device 106 and/or the participant devices 108, or may be otherwise performed.

In an embodiment, a computing system request is received at block 602. The computing system request may have or be in a standardized request format and may include a codified architecture and/or a topology criterion. For example, an operator of the manager device 102 may require the use of one or more than one applications for the performance of some tasks. Accordingly, a requestor may make a computing system request for utilization of the application, in which the utilization of the application may include inherent computing system requirements for the execution of the application on the scale requested by the requestor. For example, depending upon the application and/or the scale of the requested utilization of the application, various computing capabilities, memory requirements, or the like, may be required.

In an embodiment, the topology requirement may include a distance from a specified location, a security attribute, an architecture type, or a combination thereof. For example, in some embodiments, the application may access data, such as the application data 116, which may be stored in the database 110. Accessing the application data 116 by the application may result in a certain degree of roundtrip latency associated with operation of application, which may impact the performance of the application. In some embodiments, the application may utilize certain types of data and/or perform certain functions that may require particular security attributes or certifications. For example, applications utilizing personal healthcare information may be required to meet certain securing requirements in order to by HIPAA compliant. Various other securing requirements or certifications may be required by the applications.

A build request is generated at block 604 based on the computing system request. As generally discussed above, an operator of the manager device 102 may seek the use of one or more than one applications and may make a request for the use of such applications, which request may have been received at block 602. In response to receiving the request, build request may be generated at block 604. The build request may be a request to allocate the necessary computing resources available through the computing resource devices 106 that are capable of supporting the requested applications. Further, the build request may include a request to build, or create, an instantiation of the one or more than one applications requested through the manager device 102 (e.g., by the device operator), as well as any other additional software that may be necessary for the instantiation and use of the one or more than one applications, such as an appropriate operating system, and the like.

In an embodiment, the system requirements and any additional software or software attributes required for the instantiation and use of the one or more than one applications may be specified in the application requirements data 112. In such an embodiment, generating the build request may include accessing the application requirements data 112 from the database 110. The database 110 may be accessed directly by the manager device 102, may be accessed via the network 104, and/or may be otherwise accessed. Further, in some embodiments, the build request may include a request to build an instantiation of a virtual machine executing the appropriate operating system, the requested one, or more than one, applications, as well as any additional software that may be necessary to the execution and/or utilization of the one, or more than one, requested applications.

A computing resource device 106 meeting the topology criterion specified in the request for the application may be identified at block 606. A single computing resource device 106 and/or multiple computing resource devices 106 may be identified. In some embodiments, the identified computer resource device 106 is in accordance with the codified architecture specified through the computing system request.

In some embodiments, the one or more than one applications may be normalized, such that the applications may be executable on most any computing platform that provides a defined set of low-level requirements. In an example embodiment, the applications may be capable of being executed in any environment providing a 64-bit LINUX kernel, running GNU binutils, and providing secure shell (e.g., SSH) access to a non-root, user account. In some embodiments, a computing resource device 106 meeting the foregoing low-level requirements may be suitable for executing the one or more than one applications, independent of other architecture and/or infrastructure attributes of the computing device. Further, identifying a suitable computing resource device 106 meeting the topology criterion specified in the request may include identifying one, or more than one computing resource devices 106, that satisfy the topology and/or other criterion specified in the application request. Identifying the one, or more than one, computing resource devices 106 may include comparing the attributes of various computing resource devices 106 to the topology criterion. In some embodiments, comparing the attributes of various computing resource devices 106 to the topology criterion may include querying operators of various computing resource devices 106 for information relative to topology criterion. In some embodiments, attributes of various computing resource devices 106 may be identified and aggregated, e.g., as by being stored as the computing resource data 114 stored within the database 110. As such, in some embodiments comparing the attributes of various computing resource devices 106 to the topology criterion of the requested application may include accessing the computing resource data 114 in the database 110, either directly, via the network 104, or otherwise. In some embodiments, the computing resource data 114 may be periodically and/or continuously updated. Based upon, at least in part, the comparison of the topology criterion to the attributes of various computing resource devices 106, a suitable computing resource device 106 meeting the topology criterion may be identified and selected for executing the one, or more than one, applications.

A virtual machine is built on the computing resource device 106 at block 608 based upon the build request. For example, the build request generated at block 604 may be transmitted to an entity controlling the computing resource device 106 identified as meeting the topology criterion. The build request may request an instantiation of a virtual machine executing the appropriate operating system for the one, or more than one, requested applications, as well as any other standard software or utilities that may be provided by the entity controlling the computing resource device 106. As described above, in some embodiments, the entity operating the computing resource device 106 suitable for executing the one, or more than one, requested applications may include a cloud computing operator, e.g., who may provide computing resources on one or more than one computing resource devices 106 for a fee. In some embodiments, the computing resource device 106 meeting the topology criterion may be operated by the entity operating the manager device 102. In response to the transmitted request, a virtual machine including the desired memory, storage, computing capability may be built on the computing device. Further, the appropriate operating system, as well as any other standard software that might be necessary to the execution and/or utilization of the one, or more than one, requested applications may be configured and executed by the virtual machine.

Additionally, the one, or more than one, requested applications may be deployed on the virtual machine as normalized applications, at block 610, based on the build request to create an instantiated software deployment. In some embodiments, as generally described above, deploying the one or more than one applications requested by the operator of the manager device 102 as normalized applications may allow the same normalized application, or applications, to execute on a variety of different computing resource devices 106, which may include different device architectures, devices utilizing a variety of different infrastructure configurations, devices executing different operating system versions, or the like, without requiring a different software version or configuration. As such, the normalized applications may be device agnostic as long as the computing resource device 106 satisfies a few low-level requirements. In an embodiment, deploying the normalized application, or applications, may include injecting the normalized applications into the virtual machine environment as .rpm file format package, or packages. Other mechanisms for deploying the normalized applications may also be utilized.

In an embodiment, the one, or more than one, requested applications may be normalized by configuring the applications to be completely self-contained within user space runtime on the virtual machine. In an embodiment, the one, or more than one, applications may be normalized to provide the normalized applications by identifying all of the application dependencies (e.g., shared libraries or the like) for the applications and bundling the dependencies and libraries to create an independent container, which may be independent in a runtime environment. Further, because the normalized applications may be completely independent in the runtime environment, the one, or more than one, normalized applications may run in user space, and therefore may not require elevated privileges, as the normalized applications may not include, or require, any outside dependencies.

In an example embodiment consistent with the foregoing, the normalized application, or applications, may run in non-root user space runtime. For example, the normalized application, or applications executing on the virtual machine may create an environment to run a Mule Enterprise Service Bus out of the user home directory of the virtual machine. As such, the normalized application may run as a single user, which may include a non-privileged user (with respect to the operation and/or management of the virtual machine). Such a configuration may allow the environment of the normalized application to be replicated anywhere. Further, the normalized application may be managed at user space and separate from the underlying operating system of the virtual machine (e.g., which may allow the application to be managed by a non-privileged user, as described above). Accordingly, in some embodiments, the operations and management of the normalized application, or applications, may be the same regardless of the computing devices and/or virtual machines, on which the applications execute, because the normalized management layer (via user space environment) may remain common for different computing devices, computing device architecture, infrastructure, or the like. As such, in some embodiments, it may not be necessary to adapt or modify the normalized applications and/or any associated management layer to operate on different computing resource devices 106.

In some embodiments, the use of normalized applications may allow the applications to be isolated and/or insulated from the underlying architecture and/or infrastructure of the computing resource devices 106 upon which the applications are deployed. For example, the normalized applications may remain independent from the version of the operating system executed by the virtual machine, the operating system revision, other software installed on the virtual machine. Further, in some embodiments, the normalized applications may be installed on a variety of virtual machines (e.g., such as MICROSOFT or LINUX virtual machines) in a generally consistent manner, e.g., which may not vary for different computing systems, operating system versions, and the like. The normalized applications may also generally be managed in a consistent manner across various different computing environments. Additionally, in some embodiments, the use of normalized applications, which may be self-contained in user space at runtime, may allow the operator of the computing resource devices 106 the freedom to patch and/or upgrade the host operating system without impacting the normalized application, because the normalized applications may not share, or be dependent upon, any binaries or libraries of the host operating system.

In an embodiment, the independence of the normalized applications from the underlying architecture and infrastructure of the computing device upon which the normalized applications are executed may, for example, allow the normalized applications to be deployed on any computing device capable of providing the above-discussed low-level requirements. Therefore, it may be possible to move the deployment of the normalized applications from one computing resource device 106 to another, without having to consider the characteristic of the target computing resource device 106 to which the application may be moved and/or without having to reconfigure or modify the normalized applications, and/or to select specific versions of the application based on the computing resource device 106, or computing environment, attributes. Accordingly, in some embodiments computing resource devices 106 may be selected for deploying the requested applications (e.g., as requested by the device operator of the manager device 102) based upon, at least in part, for example, cost of deploying the applications on a given computing resource device 106

(e.g., which may include cost of maintaining an operating computing resource devices 106 and infrastructure, payments to third parties operating for-hire computing resources, such as cloud computing resources).

In an embodiment, multiple computing resource devices 106 may be analyzed at block 612. The computing resource devices 106 may be analyzed to identify different available computing resource devices 106 that may meet the topology criterion. The computing resource devices 106 may be internal or external to a company from which the request originated. The computing resource devices 106 may be associated with a single company or multiple different companies. In addition to identifying different available computing resource devices 106 the meet the topology criterion, a cost analysis may be conducted for different computing resource devices 106, for example, to identify the computing resource devices 106 among known and/or available computing resource devices 106 that may provide a greatest cost advantage for instantiating the one, or more than one, applications. In an embodiment, analyzing the computing resource devices 106 may include calculating an instantiated software deployment cost associated with future use of the instantiated software deployment. For example, the one or more than one requested applications may be deployed as normalized applications on the computing resource device 106 as an instantiated software deployment. The cost of maintaining and utilizing the instantiated software deployment may be calculated for future time period. The further time period may be, for example, the use of the instantiated software deployment for one or more days, weeks, months, or the like In an embodiment, analyzing the computing resource devices 106 may include calculating an additional instantiated software deployment cost associated with future use of the additional instantiated software deployment. For example, the one or more than one applications may be deployed as normalized applications on a second computing resource device 106 as an additional instantiated software deployment in addition to the instantiated software deployment on a first computing resource device 106. The cost for operating such additional instantiated software deployment may be calculated for operating and utilizing the one or more than one applications for the future time period. In an embodiment, calculating the additional instantiated software deployment cost may include determining an additional virtual creation cost associated with building the additional virtual machine and deployment of the applications on the additional virtual machine. For example, the virtual creation cost may include the cost associated with building a virtual machine on the other computing resource device 106 capable of executing the application. Additionally, the cost for deploying the normalized application on the other computing resource device 106. The cost for deploying the normalized application on the other computing resource device 106 may include the cost of transmitting (e.g., bandwidth requirements and cost) the normalized software application to the other computing resource device 106, and the cost for installing the normalized software applications on the virtual machine built on the other computing resource device 106. In some embodiments, calculating the additional instantiated software deployment cost associated with future use of the additional instantiated software deployment may include determining a future use operation cost associated with the additional instantiated software deployment after building the additional virtual machine and deployment of the applications on the additional virtual machine. In some embodiments, the future use of the additional instantiated software deployment may include the cost of maintaining an operating the computing resource device 106 and the associated infrastructure. In an embodiment in which the other computing resource device 106 may include a cloud computing resource, the cost for the future use may be the cost charged by the operator of the cloud computing resource for the use of the computing resource based upon, for example, computing cycles, memory usage, storage, or the like.

Based on a determination that the additional instantiated software deployment cost is less than the instantiated software deployment cost, the additional instantiated software deployment may be selected for creation. For example, the cost for future operation of the existing instantiated software deployment may be compared to the cost for creating the additional instantiated software deployment and for the future operation of the additional instantiated software deployment. In a situation in which the cost for creating and operating the additional instantiated software deployment may be less than the future operation cost of the existing instantiated software deployment, the additional instantiated software deployment may be selected for creation.

In an embodiment, an additional virtual machine may be built on a different computing resource device 106 based on the build request at block 614. For example, based on a determination that the additional instantiated software deployment may be more cost effective than maintaining the existing instantiated software deployment, the additional software deployment may be created on a different computing resource 106, including building an additional virtual machine that may be capable of executing the one, or more than one, normalized applications as the additional instantiated software deployment. For the applications, in the form of the one, or more than one, normalized applications, may be deployed on the additional virtual machine at block 616, based upon, at least in part, the build request to create the additional instantiated software deployment. Building the additional virtual machine and/or deploying the one, or more than one, normalized applications on the additional virtual machine may be based upon, at least in part, the build request and analysis of the computing resource devices 106. For example, and as generally discussed above, based upon, at least in part, a cost-value analysis of the existing instantiated software deployment and potential additional instantiated software deployments utilizing different available computing devices, the additional instantiated software deployment may be created at a computing device providing the greatest cost-benefit outcome. Creating the additional instantiated software deployment may include building an appropriate virtual machine on an additional computing resource device 106 for executing the requested applications, and deploying the requested applications as the one, or more than one, normalized applications, e.g., which may be generally device agnostic, as described above.

In an embodiment, creating the instantiated software deployment may include associating resources with a particular application on the virtual machine. For example, and as generally described above, one or more than one of the requested applications may, during operation of the applications, utilize various resources, such as the application data 116 included within the database 110. Accordingly, the application data 116 may be associated with one or more than one applications of the instantiated software deployment, e.g., to permit operation of the applications utilizing the application data 116. In an embodiment, creating the additional instantiated software deployment may include reassociating the resources with the application on the additional virtual machine. For example, in a generally corresponding manner as associating the application data 116 with one or more applications of the instantiated software deployment, the application data 116 may be reassociated with one or more applications of the additional instantiated software deployment, e.g., to permit operation of the one or more applications of the additional instantiated software deployment utilizing the application data.

In an embodiment, associating the resources with one or more than one of the applications of the existing instantiated software deployment may include mapping the resources to the application on the virtual machine (e.g., which is executed on the computing resource device 106). In an embodiment, reassociating the resources may include mapping the resources to the one or more than one applications of the additional instantiated software deployment executed on the additional virtual machine. Further, reassociating the resources may also include unmapping the resources to the one or more the one applications of the existing instantiated software deployment executed on the virtual machine.

In an embodiment, the instantiated software deployment may be disabled based upon, at least in part, the creation of the additional instantiated software deployment. For example, once the additional instantiated software deployment has been created on the computing resource 108, and any necessary resources (such as the application data 116) have be reassociated (e.g., as by being remapped) with one or more applications of the additional instantiated software deployment, the additional instantiated software deployment may take over the operations of the one, or more than one, applications requested by the device operator of the manager device 102. Once the additional instantiated software deployment takes over the operations of the one, or more than one, applications, the instantiated software deployment on the computing resource 106 may be disable.

Figure 7:
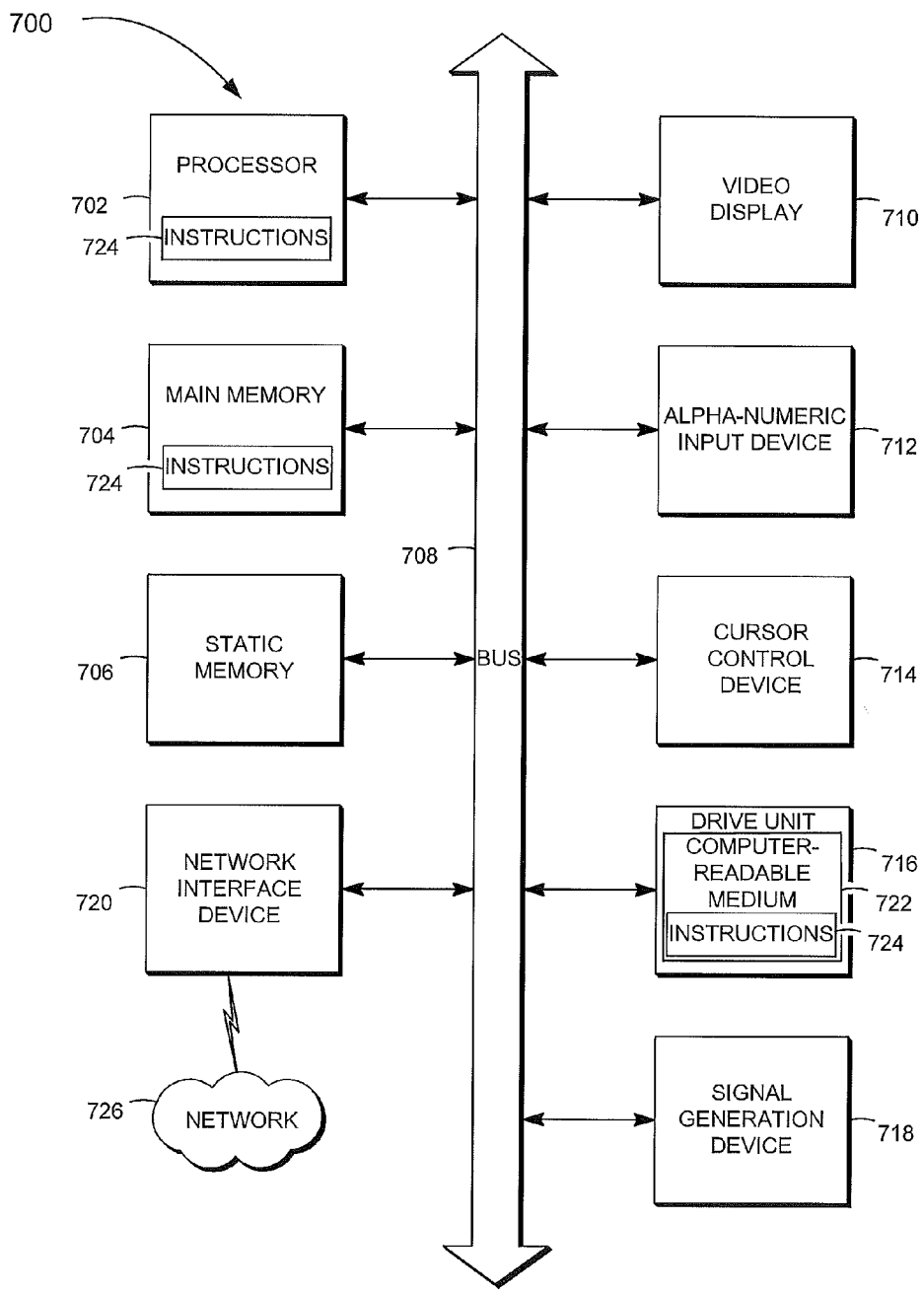
FIG. 7 is a block diagram of a machine in the example form of a computer system within which a set of instructions for causing the machine to perform any one or more of the methodologies discussed herein may be executed or stored.

FIG. 7 shows a block diagram of a machine in the example form of a computer system 700 within which a set of instructions may be executed causing the machine to perform any one or more of the methods, processes, operations, or methodologies discussed herein. The manager device 102, the computing resource device 106, and/or the participant device 108 may include the functionality of the one or more computer systems 700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 further includes a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a drive unit 716, a signal generation device 718 (e.g., a speaker) and a network interface device 720.

The drive unit 716 includes a computer-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting computer-readable media.

The software 724 may further be transmitted or received over a network 726 via the network interface device 720.

While the computer-readable medium 722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a method includes receiving a computing system request, the computing system request being in a standardized request format and including a topology criterion. A build request may be generated based on the computing system request. A computing device may be identified meeting the topology criterion. The method may also include building a virtual machine on the computing device based on the build request. A plurality of normalized applications may be deployed on the virtual machine based on the build request to create an instantiated software deployment. Additional methods and systems are disclosed.

In an example embodiment, a computing system request is received. The computing system request may be in a standardized request format and include a codified architecture and topology criterion. A build request is generated based on the computing system request. A computing resource device in accordance with the codified architecture and meeting the topology criterion is identified. A virtual machine is built on the computing resource device based on the build request. A plurality of applications is deployed on the virtual machine based on the build request to create an instantiated software deployment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, "a" or "an" may reflect a single part or multiple parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. Thus, systems and methods for pharmacy messaging have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
   receiving a computing system request, the computing system request being in a standardized request format and including a codified architecture and topology criterion;
   generating a build request based on the computing system request;
   identifying a first computing resource device in accordance with the codified architecture and meeting the topology criterion;
   identifying a second computing resource device in accordance with the codified architecture and meeting the topology criterion;
   conducting a cost analysis for the first and second computing resource devices;
   identifying a computing resource device from the first and second computing resource devices that provides the greatest cost advantage based on the cost analysis;
   wherein the cost analysis of the computing resource devices including calculating an instantiated software deployment cost associated with future use of the instantiated software deployment;
   building a virtual machine on the identified computing resource device based on the build request; and
   deploying a plurality of applications on the virtual machine based on the build request to create an instantiated software deployment.

2. The method of claim 1, further comprising:
   building an additional virtual machine on a different computing resource device than the identified computing resource device based on the build request; and
   deploying the plurality of applications on the additional virtual machine based on the build request to create an additional instantiated software deployment.

3. The method of claim 2, further comprising:
   analyzing a plurality of computing resource devices to identify the different computing resource device as in accordance with the codified architecture and meeting the topology criterion,
   wherein building the additional virtual machine is based on the build request and an analysis of the plurality of computing resource devices.

4. The method of claim 2, further comprising:
   associating a plurality of resources with an application of the plurality of applications on the virtual machine; and
   reassociating the plurality of resources with the application on the additional virtual machine.

5. The method of claim 4, wherein associating the plurality of resources includes mapping the plurality of resources to the application on the virtual machine and reassociating the plurality of resources includes mapping the plurality of resources to the application on the additional virtual machine and unmapping the plurality of resources to the application on the virtual machine.

6. The method of claim 2, further comprising:
   disabling the instantiated software deployment based on creation of the additional instantiated software deployment.

7. The method of claim 2, further comprising:
   calculating an instantiated software deployment cost associated with future use of the instantiated software deployment;
   calculating an additional instantiated software deployment cost associated with future use of the additional instantiated software deployment; and
   selecting the additional instantiated software deployment for creation based on a determination that the additional instantiated software deployment cost is less than the instantiated software deployment cost.

8. The method of claim 7, wherein calculating the additional instantiated software deployment cost comprises:
   determining an additional virtual creation cost associated with building the additional virtual machine and deployment of the plurality of applications on the additional virtual machine; and
   determining a future use operation cost associated with the additional instantiated software deployment after building the additional virtual machine and deployment of the plurality of applications on the additional virtual machine.

9. The method of claim 1, wherein the topology criterion includes distance from a location, a security attribute, an architecture type, or combinations thereof.

10. The method of claim 1, wherein the standardized request format includes computing capabilities, memory requirements, storage requirements, or combinations thereof.

11. The method of claim 1, wherein the build request includes a request to allocate at least sufficient computing resources to support an application identified in the computing system request.

12. The method of claim 1, wherein the build request includes a request to instantiate an application identified in the computing system request.

13. The method of claim 1, wherein conducting the cost analysis comprises:
calculating a first instantiated software deployment cost associated with future use of the instantiated software deployment on the first computing resource device;
calculating a second instantiated software deployment cost associated with future use of the instantiated software deployment on the second computing resource device; and
comparing the first instantiation software deployment cost with the second instantiation software deployment cost to determine which calculated cost is lower.

14. The method of claim 13, wherein calculating the first and second instantiated software deployment costs comprises calculating a cost of maintaining and utilizing the instantiated software deployment for a future time period on the first and the second computing resource device.

15. A non-transitory machine-readable medium comprising instructions, which when executed by one or more processors, cause the one or more processors to perform the following operations:
receive a computing system request, the computing system request being in a standardized request format and including a codified architecture and topology criterion;
generate a build request based on the computing system request;
identify a first computing resource device in accordance with the codified architecture and meeting the topology criterion;
identify a second computing resource device in accordance with the codified architecture and meeting the topology criterion;
conduct a cost analysis for the first and second computing resource devices;
identify a computing resource device from the first and second computing resource devices that provides the greatest cost advantage based on the cost analysis;
wherein the cost analysis of the computing resource devices including calculating an instantiated software deployment cost associated with future use of the instantiated software deployment;
build a virtual machine on the identified computing resource device based on the build request; and
deploy a plurality of applications on the virtual machine based on the build request to create an instantiated software deployment.

16. A system comprising:
a processor and a memory coupled to the processor;
a request receiver module deployed in the memory and executed by the processor to receive a computing system request, the computing system request being in a standardized request format and including a codified architecture and topology criterion;
a request generation module deployed in the memory and executed by the processor to generate a build request based on the computing system request;
a device identification module deployed in the memory and executed by the processor to (1) identify a first computing resource device in accordance with the codified architecture and meeting the topology criterion; (2) identify a second computing resource device in accordance with the codified architecture and meeting the topology criterion; (3) conduct a cost analysis for the first and second computing resource devices; and (4) identify a computing resource device from the first and second computing resource devices that provides the greatest cost advantage based on the cost analysis;
wherein the cost analysis of the computing resource devices including calculating an instantiated software deployment cost associated with future use of the instantiated software deployment;
a build module deployed in the memory and executed by the processor to build a virtual machine on the identified computing resource device based on the build request; and
a virtual machine deployment module deployed in the memory and executed by the processor to deploy a plurality of applications on the virtual machine based on the build request to create an instantiated software deployment.

17. A method comprising:
receiving a computing system request, the computing system request being in a standardized request format and including a codified architecture and topology criterion;
generating a build request based on the computing system request;
identifying a computing resource device in accordance with the codified architecture and meeting the topology criterion;
building a virtual machine on the computing resource device based on the build request;
deploying a plurality of applications on the virtual machine based on the build request to create an instantiated software deployment building an additional virtual machine on a different computing resource device based on the build request;
deploying the plurality of applications on the additional virtual machine based on the build request to create an additional instantiated software deployment calculating an instantiated software deployment cost associated with future use of the instantiated software deployment;
calculating an additional instantiated software deployment cost associated with future use of the additional instantiated software deployment; and
selecting the additional instantiated software deployment for creation based on a determination that the additional instantiated software deployment cost is less than the instantiated software deployment cost.

* * * * *